United States Patent [19]
McHarg et al.

[11] Patent Number: 5,291,482
[45] Date of Patent: Mar. 1, 1994

[54] HIGH BANDWIDTH PACKET SWITCH

[75] Inventors: Christopher G. McHarg, Winfield; Thomas E. Newman, Wheaton; Kenneth N. Schaff, Warrenville; Kenneth E. Wendland, St. Charles, all of Ill.

[73] Assignee: AT&T Bell Laboratories, Murray Hill, N.J.

[21] Appl. No.: 919,461

[22] Filed: Jul. 24, 1992

[51] Int. Cl.⁵ .......................................... H04L 12/56
[52] U.S. Cl. ....................................... 370/60; 370/60.1
[58] Field of Search ................. 370/60, 60.1, 94.1, 370/94.2, 58.1, 58.2, 58.3, 61

[56] References Cited

U.S. PATENT DOCUMENTS

| | | | |
|---|---|---|---|
| 4,322,843 | 3/1982 | Beuscher et al. | 370/63 |
| 4,751,697 | 6/1988 | Hunter et al. | 370/60 |
| 4,780,870 | 10/1988 | McHarg et al. | 370/60 |
| 4,821,259 | 4/1989 | DeBruler et al. | 370/60 |
| 5,210,743 | 5/1993 | Eilenberger et al. | 370/60 |
| 5,212,686 | 5/1993 | Joy et al. | 370/60 |

FOREIGN PATENT DOCUMENTS

91/08630  6/1991  PCT Int'l Appl. .

Primary Examiner—Wellington Chin
Attorney, Agent, or Firm—Michael B. Johannesen

[57] ABSTRACT

A fast packet switch comprising one buffer directly connected between a plurality of input ports and a plurality of output ports to effect rapid throughput of data packets. A pointer to a location in the buffer is allocated by a buffer manager upon receipt of notification of an incoming packet at the receiving input port and the input port delivers the packet as it is received to the location designated by the pointer. After the data packet is received, the input port delivers the pointer and a destination address for the packet to a router, which selects one of the plurality of output ports based on the destination address. The router queues the pointer in a queue for the selected output port. The output port then retrieves the data packet from the buffer using the pointer to determine the location, and transmits the data packet. After the transmission is complete, the output port returns the pointer to the buffer manager. This packet switch may be pipelined to receive, route, and transmit simultaneously on adjacent data packets.

28 Claims, 11 Drawing Sheets

FAST PACKET SWITCH

FAST PACKET SWITCH DATA TIMING

RCVR CHANNEL STATUS RAM PROTOCOL STATE REGISTERS

RCVR CHANNEL STATUS RAM ADDRESS STATE REGISTERS

XMTR CHANNEL STATUS RAM PROTOCOL STATE REGISTERS

XMTR CHANNEL STATUS RAM ADDRESS STATE REGISTERS

ROUTER

BUFFER MANAGER OUTPUT TIMING

BUFFER MANAGER INPUT TIMING

HIGH BANDWIDTH PACKET SWITCH

CROSS-REFERENCE TO RELATED APPLICATION

This application is related to U.S. patent application Ser. No. 07/919,462 entitled "Circulating Pointer Monitor," filed concurrently with this application.

TECHNICAL FIELD

This invention relates to the field of packet-switched communications networks, and, more specifically to packet-switching control data information among control units in a distributed processing switching system.

BACKGROUND OF THE INVENTION

As more packetized data is being transmitted on the telephone network, there is a need for increasing the speed (bandwidth) of the network. Modern telecommunications networks can only be as fast as the packet switching systems used to route the data packets from source to destination. Therefore, there is a need for higher bandwidth packet switching systems.

Switching systems are relying more and more on distributed control to increase the speed at which they can switch data packets and voice calls. Distributed control switching systems, which are conceptually small telecommunications networks, use packet switching for communicating control information rapidly among the distributed processors. Without fast communication of control information, the capacity of the switch becomes limited by the number of control messages that can be handled at one time, thus causing a bottleneck in the network. Therefore, both the network in general, and distributed processing switching systems specifically, have a need for high bandwidth packet switching.

Various packet switching systems have been tried for routing control information in distributed processing switching systems with varying degrees of success. Some systems have provided a separate controller bus structure to be used for all communications among the processors. Other systems have utilized dedicated communication paths of the switching system to provide communication between the distributed system processors and a central controller which interprets control information and directs the overall operation of the switching system. These known systems, however, require that complex and time consuming operations be performed in their implementations. Such systems cannot take full advantage of distributed processing due to their reliance on a central controller to direct the distributed processors.

A control information communication arrangement in accordance with the invention of U.S. Pat. No. 4,322,843 of H. J. Beuscher et al., issued Mar. 30, 1982, achieves the benefits of interprocessor communication while reducing the complexity and time consuming nature of previous arrangements. In accordance with one exemplary embodiment of the invention of the Beuscher patent, control units intercommunicate via certain switching system communication paths by means of control messages or packets comprising a plurality of control words. A control distribution unit included in the system accumulates the received control words into control packets and stores all such control packets in a shared memory. The control packets are then sequentially packet switched by transferring the packets individually from shared memory to appropriate facilities for subsequent transmission to destination control units defined by the packet headers. However, the sequential nature of the packet switching mechanism substantially limits the capacity of the control distribution unit to switch control packets. This limitation becomes particularly significant when the system control processors are used to implement features associated with the provision of integrated services digital network (ISDN) capabilities.

One potential solution to this problem is found in U.S. Pat. No. 4,821,259 of DeBruler et al., issued Apr. 11, 1989, wherein a packet switch for inter-module communication within a switch is disclosed which packet switches inter-module control packets via independent paths to high speed outgoing packet channels for transmission to destination control units. A ring-based packet switch is disclosed in one exemplary embodiment of the invention of the DeBruler patent, with a circuit-switched fabric controlled in real time by a high speed, multiple token passing ring. However, this system is expensive to retrofit onto an existing switching system because packet channels and circuit channels have to be segregated when the link first enters the intermodule connection unit, and because modifications must be made to each module of the distributed processing switch that communicates through this system, as well as each packet and circuit switching control units.

Furthermore, each of these packet switches have buffering of the incoming data packet at the input port. Such buffering requires at least the duration of receipt of a packet to accumulate a data packet before it is routed through the packet switch, thus taking time before the packet can be switched. Furthermore, moving an entire data packet through a switch is a time-consuming process. In some examples, such as DeBruler, the data packet is again buffered at the output port, requiring more time. Therefore, buffering of packets before and/or after switching causes loss of performance in known packet switches.

In view of the foregoing, a recognized problem in the art is the limited capacity of packet switching facilities used for interprocessor control communication in distributed processing switching systems.

SUMMARY OF THE INVENTION

A low cost, fast packet switch according to this invention uses one buffer directly connected between a plurality of input ports and a plurality of output ports to effect rapid throughput of data packets. Advantageously, a pointer to a location in the buffer is allocated by a buffer manager upon receipt of notification of an incoming packet at the receiving input port and the input port delivers the packet as it is received to the location designated by the pointer. After the data packet is received, the input port delivers the pointer and a destination address for the packet to a router, which selects one of the plurality of output ports based on the destination address. The router queues the pointer in a queue for the selected output port. The output port then retrieves the data packet from the buffer using the pointer to determine the location, and transmits the data packet. After the transmission is complete, the output port returns the pointer to the buffer manager. Advantageously, a packet switch, according to this invention, may be pipelined to receive, route, and transmit simultaneously on adjacent ports.

A packet switch according to this invention may be implemented on one board, thus facilitating easy retrofit onto existing distributed control switching systems with minimal modifications to other modules.

DETAILED DESCRIPTION

Figure 1:
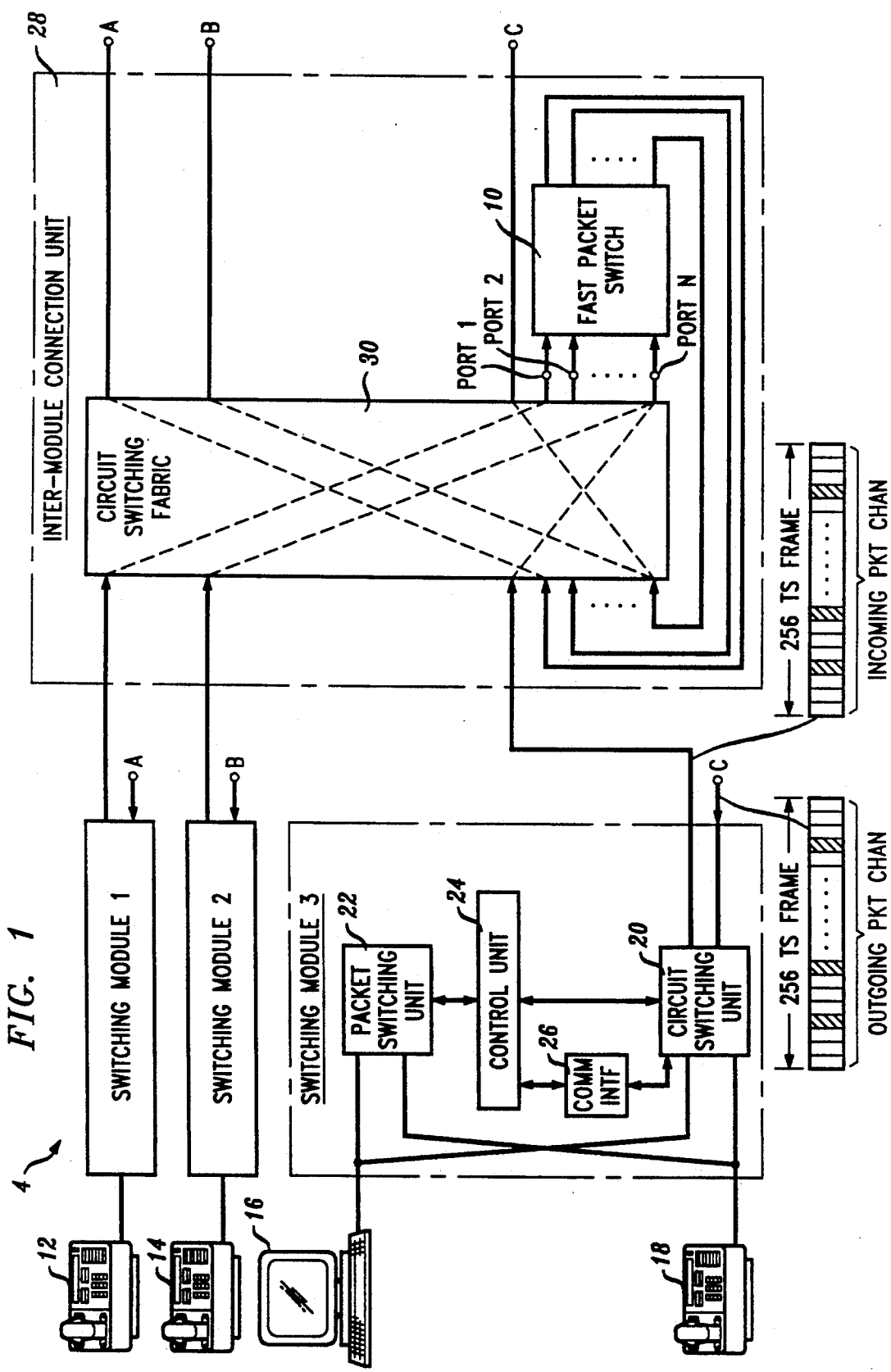
FIG. 1 is a block diagram illustrating an exemplary embodiment of this invention in the context of a distributed control switching system.

FIG. 1 is a block diagram illustrating an exemplary embodiment of this invention in the context of a distributed processing switching system, wherein a fast packet switch 10 according to this invention is used to route packets containing control messages from a source module to a destination module. Switching system 4 includes a plurality of switching modules, e.g., 1, 2, and 3, to provide both circuit switching and packet switching service, via a plurality of access ports, to a plurality of user stations, e.g., 12, 14, 16, and 18. In this exemplary embodiment, user stations 12, 14, and 18 are telephone station sets, such as AT&T ISDN 7506 or 7507 telephones. User station 16 is a data terminal, as is known in the art. Each user station transmits information to and receives information from its associated switch module, for example switch module 3, in two circuit-switched B-channels and one packet-switched D-channel (which is a typical ISDN line). B-channels are connected to a circuit switching unit 20 and D-channels are connected to a packet switching unit 22.

A control unit 24 is used both to control the establishment of circuit switched connections by circuit switching unit 20 and the establishment of packet switched connections by packet switching unit 22. Communications interface 26 provides protocol handling for interprocessor communication.

Each switching module is connected to an intermodule connection unit 28 by a 256 time slot, incoming time multiplex link and a 256 time slot, outgoing time-multiplex link. Packet channels comprise one or more time slots on the ingoing/outgoing time multiplexed line. In FIG. 1, the 3 shaded time slots shown in the 256 time slot (TS) frame comprise a packet channel between switching module 3 and the fast packet switch. Circuit switched paths are permanently set up at the time of initialization to provide a clear channel between the communications interface 26 and the fast packet switch 10. Note that the packet channels from both switch module 2 and 3 have circuit switched paths to the same port on the fast packet switch. In the exemplary implementation, each port on the Fast Packet Switch is capable of handling up to 32 packet channels. Packets received on the incoming packet channels are switched in circuit switching fabric 30.

A telephone call is initiated from telephone 18 to telephone 12, for example, by the user of telephone 18 removing the handset from the switchhook, which causes telephone 18 to send a message to packet switch unit 22. In response to the message, packet switch unit 22 informs control unit 24 that telephone 18 has gone offhook and control unit 24 causes circuit switching unit 20 to send a dial tone to telephone 18. The user of telephone 18 then enters digits which are sent via packet switching unit 22 to control unit 24. Control unit 24 performs digit analysis on the digits collected from telephone 18 and, as a result, decides that the call is for telephone 12, connected to switch module 1.

Control unit 24 formats a message for the control unit in switch module 1 (not shown) to inform the switch module that it needs to request switch module 1 to determine if telephone 12 is busy. Control unit 24 formats a message and sends it through communications interface 26, which packages the message in a standardized protocol and sends the message through circuit switching unit 20. Circuit switching unit 20 and circuit switching fabric 30 in intermodule connection unit 28 pass the message through permanently connected paths to port N of fast packet switch 10. Fast packet switch 10 routes the message through the switch, as will be described hereinafter below, back into circuit switch fabric 30, which passes the message through connector A to switching module 1. Switching module 1 responds in a similar manner through circuit switching fabric 30, fast packet switch 10, and circuit switching fabric 30 through connector C. From connector C the message travels through circuit switching unit 20 and through communications interface 26 to control unit 24. Call processing continues in this manner until a connection is made between telephone 18 and telephone 12.

Figure 2:
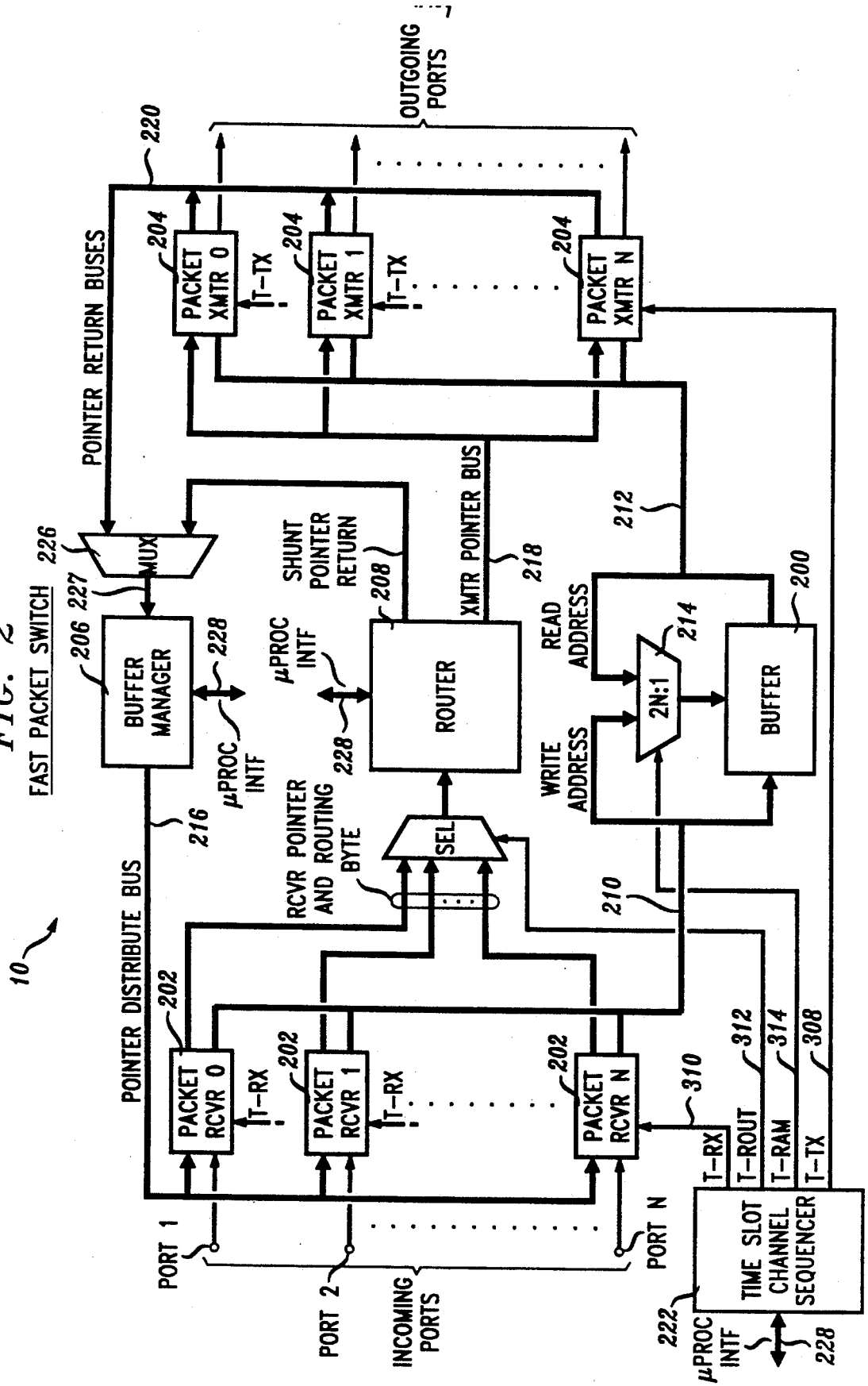
FIG. 2 is a diagram illustrating a fast packet switch as shown in FIG. 1, built according to an exemplary embodiment of this invention.

FIG. 2 is a block diagram illustrating an exemplary embodiment of a fast packet switch 10 in accordance with the present invention. Fast packet switch 10 comprises a single buffer 200, a plurality of packet receivers 202 that have access to buffer 200 and a plurality of packet transmitters 204 that also have access to buffer 200. Buffer 200 is organized into a number of fixed length locations. A pointer comprises an address of a location in buffer 200. Pointers to free buffer locations are stored in buffer manager 206.

Packet traffic is delivered to packet switch 10 over packet channels comprising one or more time slots at incoming ports 1—N. Receiver 202 obtains a pointer from buffer manager 206 and writes an incoming packet into a buffer location starting at the pointer address. After the packet is written into buffer 200, the routing byte from the packet containing the packet's destination is forwarded, along with the pointer, to a Router 208. Router 208, as will be described below, comprises a lookup table that maps the logical routing byte to a physical packet channel number. Router 208 then pushes the pointer onto a TX pointer FIFO queue (described below in connection with FIG. 11) for the physical packet channel to which the packet has been routed. The packet transmitter 204 pops the pointer from the FIFO queue, reads the data from buffer 200, and transmits the data over the appropriate outgoing port channel. After the packet is transmitted, the pointer is returned to buffer manager 206 by packet transmitter 204, thus freeing the RAM buffer for another packet.

Data Flow

Packet channels come into the packet switch from the circuit switching fabric through a plurality of input ports 1−N. Each input port comprises a plurality of multiplexed time slots. For each input port, there is a time multiplexed packet receiver 202 capable of handling multiple packet channels. Each packet receiver 202 is connected to a time multiplexed write bus 210, through which the packet receivers 202 write received packet data into buffer 200. Packet data is read from buffer 200 through a time multiplexed read bus 212. Both the write bus 210 and the read bus 212 transmit address and data information. A multiplexer 214 at buffer 200 selects which bus will supply the address for a given operation. Multiplexer 214 and write enable selection (not shown) are controlled in a time multiplexed, deterministic fashion, as will be described below, in connection with the timing diagram of FIG. 4, advantageously avoiding a complex arbitration circuit for buffer 200. Packet transmitters 204 read data from the buffer 200 through read bus 212 and transmit packets to the circuit switching fabric on multiplexed time slots through output ports.

Packet switch implementations may vary in the number of packet transmitters 204 and receivers 202, and in the number of multiplexed time slots on an incoming port. For the purposes of describing this exemplary embodiment, the packet switch is described with four packet receivers 202, and four packet transmitters 204. In this exemplary embodiment, each incoming and each outgoing port has 256 time slots.

Each packet receiver 202 and transmitter 204 handles multiple packet channels. Each packet channel comprises a group of time slots, which constitute an OSI level 1 packet link, when concatenated. For the purposes of this description, each packet receiver 202 and transmitter 204 handles up to 31 packet channels. Each packet channel consists of time slots from one port only; therefore a channel cannot be distributed over multiple ports.

Buffer 200 contains a multiplicity of fixed length locations, each large enough to buffer the largest packet that the switch can transmit and receive. For the purposes of this description, the largest packet size is 576 bytes. There are 455 buffers contained in buffer 200 in this exemplary embodiment. A 576 byte packet size handles a user data field length of 512 bytes with 64 bytes available for protocol header information, which has been found to be sufficient for several layers of protocol. In the preferred embodiment of this invention, buffer 200 comprises a fast random access memory.

Control Flow

Buffer manager 206 provides a storage area for pointers to idle locations in buffer 200. At system initialization, there is no packet traffic in the switch and all locations in buffer 200 are idle. All pointers are queued in buffer manager 206. When an incoming packet is detected by a packet receiver 202, it requests a pointer from buffer manager 206. The pointer is delivered over pointer distribute bus 216. Packet receiver 202 uses the pointer to calculate the addresses in buffer 200 for writing of the incoming packet data.

As the incoming packet is received, packet receiver 202 extracts the routing byte (the logical destination for the packet) from a predetermined fixed location in the packet, and saves it in a holding register. When packet receiver 202 receives the closing flag for a packet, integrity tests, as known in the art, are performed, and the routing byte and the pointer are passed to router 208.

Router 208 comprises a RAM containing a lookup table. The lookup table maps the logical destination contained in the routing byte to a physical packet channel number, which is then used to select an XMTR pointer FIFO (shown below in connection with FIG. 11). The XMTR pointer FIFO circuit contains one FIFO for each packet channel on each packet transmitter 204. For purposes of this description, there are four packet transmitters 204, each handling up to 31 packet channels; therefore there are 124 usable XMTR pointer FIFOs. Router 208 pushes the pointer from the packet receiver 202 onto the FIFO selected by the channel number from the routing table. The pointers in the XMTR pointer FIFO represent packets being queued for transmission.

Each packet transmitter 204 queries the XMTR pointer FIFOs associated with its packet channels when a channel is idle. If a pointer is queued in the FIFO, it is popped off the FIFO and read by the packet transmitter 204 over the XMTR pointer bus 218. The packet transmitter 204 calculates the addresses in buffer 200 from which to read packet data for the outgoing packet based on the pointer. When packet transmission is completed, the packet transmitter 204 returns the pointer to buffer manager 206 over pointer return bus 220, and queries the XMTR pointer FIFO for another queued pointer. When the pointer is returned to buffer manager 206, the location in buffer 200 associated with that pointer is effectively idled, and available for use by another incoming packet.

A pointer may alternatively be returned from router 208 to buffer manager 200 via shunt pointer return bus 224. A pointer is returned from the router when, for example, the data packet did not pass integrity check at packet receiver 202 or the queue for the destination channel is full. Pointer return buses 220 and shunt pointer return buses 224 are multiplexed into buffer manager 206 at multiplexer 226 under control of time slot channel sequencer 222 (control line not shown for clarity). The output of multiplexer 226 is delivered to buffer manager 206 on MUX output on microprocessor interface bus 227.

Initialization of fast packet switch 10 is accomplished by a microprocessor (not shown) initializing data in time slot channel sequencer 222, router 208, and buffer manager 206 via microprocessor interfaces 228. After initialization, fast packet switch 10 performs its functions independent of the microprocessor. Maintenance functions and error reporting, as is known in the art, are also performed over microprocessor interface 228.

Time Slot Channel Sequencer

Figure 3:
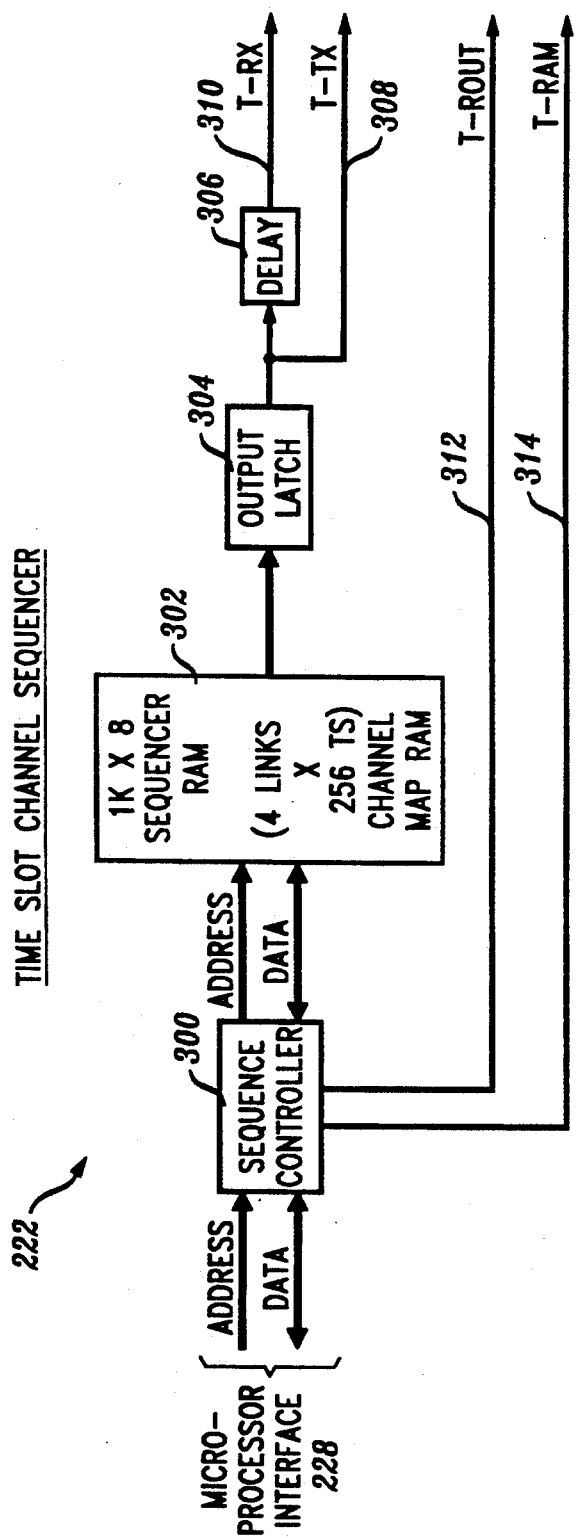
FIG. 3 is a more detailed block diagram of the time slot channel sequencer of FIG. 2 according to the exemplary embodiment of this invention.

Turning now to FIG. 3, a block diagram of a time slot channel sequencer 222 is shown according to an exemplary embodiment of this invention. Time slot channel sequencer 222 comprises a sequence controller 300, coupled via address and data buses to a sequencer RAM 302. Sequence controller 300 and sequencer RAM 302, together, provide timing signals and time slot channel data for controlling the fast packet switch 10 of this invention. Time slot channel sequencer 222, provides the T-TX, and T-RX buses which dynamically inform the packet transmitters 204 and receivers 202 of what packet channel the next time slot is part of. Data mapping time slots to channels are stored in sequencer RAM 302 which is readable and writable via microprocessor interface 228. Sequencer RAM 302 contains one byte of data for each of the 256 time slots on each of the 4 ports of this exemplary packet switch. This data indicates whether the time slot is part of a packet channel, which channel, and the active/standby state of the channel. Since all connections in circuit switching fabric 30 (FIG. 1) are 2-way connections, a packet channel will use the same time slots for transmitting and receiving, making it possible to use one sequencer for both transmitting and receiving.

Sequencer RAM 302 is initialized so that all time slots are idle, that is, not associated with a packet channel. The microprocessor sets up a packet channel by writing a packet channel number to sequencer RAM 302 for each time slot that is part of the channel. A packet channel can be one time slot, many time slots or all time slots on a given port. After the time slots are written, a logical routing byte is associated with the physical channel by the microprocessor. In the exemplary embodiment, the logical routing byte is the switching module number.

A frame is the amount of time for all 256 time slots to be transmitted once. In telephony applications, such as this, the frame rate is typically 8 khz. Circuit switching fabric 30 provides an 8 khz signal to synchronize the fast packet switch with the time slots on the input and output ports. Sequence controller 300 sequences through all sequencer RAM 302 locations every frame.

Figure 4:
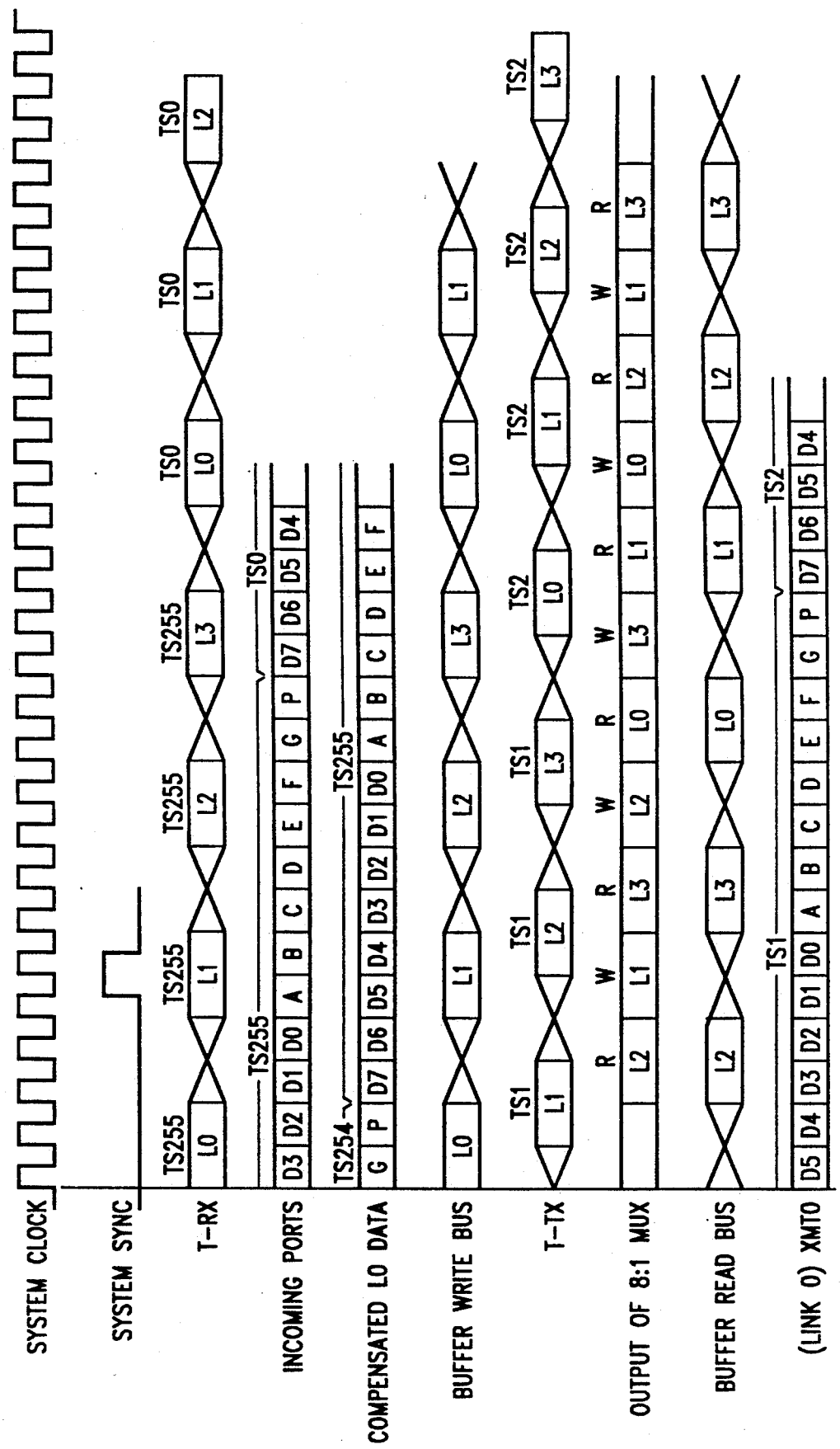
FIG. 4 is a timing diagram showing the timing of data through the fast packet switch of FIG. 2.

During the course of each frame, the contents of sequencer RAM 302 is sent on T-TX bus 308 and T-RX bus 310. During the Nth time slot, the data for the N+1 th time slot will be read from the RAM for each port, starting with port 0. Referring to FIG. 4, note that while packet RCVR0 is receiving time slot 254 (compensated L0 data), control data for time slot 255 is sent out on the T-RX bus. Data from sequencer RAM 302 is latched in output latch 304, and used to drive T-TX bus 308. By the nature of the sequential RAM read operations, T-TX bus 308 is multiplexed (as shown in the trace in FIG. 4).

Due to the pipelined nature of circuit switching fabric 30, time slots on the incoming port are delayed roughly two time slots from the outgoing port. Therefore, packet receivers 202 and associated T-RX bus 310 must also be delayed accordingly. Data from output latch 304 is delayed in delay circuit 306, as shown on FIG. 4 (when L0 data for time slot 2 appears on the T-TX bus, L0 data for time slot 0 had just been clocked on the T-RX bus).

Sequencer control sends T-ROUT 312 and T-RAM 314 signals repetitively for each time slot. The T-RAM 314 signal selects which packet transmitter 204 or receiver 202 accesses buffer 200, by controlling 2N:1 (which in this exemplary embodiment is 8:1) MUX 214. The 2N:1 MUX output trace on FIG. 4 shows how the buffer read and write cycles are allocated to the ports. The T-ROUT 312 signal performs a similar function for the pointer and routing byte buses from the packet receivers. The buses from each packet receiver are selected once per time slot.

Timing

Packet receivers 202, packet transmitters 204, buffer 200, and router 208 are all time multiplexed to allow for equal access among all components of the switch during a time slot period, under control of time slot channel sequencer 222. The timing diagram of FIG. 4 shows how the RAM bandwidth is divided into 8 RAM cycles over the period of one time slot into four read cycles and four write cycles. This packet switching concept provides for each receiver 202 and transmitter 204 to have sufficient data and control bandwidth to handle incoming and outgoing traffic on all channels of all ports at full occupancy. For the packet switch described herein, a 64 Mbps throughput is available.

Data flow through the packet switch starts at packet receiver 202 where protocol processing is performed on the data before it is stored in the buffer. The 32 MHz system clock is partitioned into 8 KHz frames which are identified by the system sync pulse, with each frame containing 256 time slots. T-RX bus 310 (originating from the time slot channel sequencer) identifies the current time slot with a logical packet channel that can comprise 1 to 255 time slots. Logical packet channels do not require contiguous time slots. This information is used by receiver 202 to retrieve state information associated with this packet channel in preparation for the incoming serial data.

Data received by the Packet Switch is represented by incoming ports 1—N. After incurring re-clocking delays (attributed to skew compensation, as will be described further, below), the data relationship to T-RX bus 310 is shown as Compensated L0 Data. The serial data is processed by the protocol state machine, as will be described further in connection with FIG. 5, in preparation for one of four RAM write cycles as indicated by the Ram Write Bus.

T-TX bus 308 identifies the current time slot with a logical packet channel that is used by packet transmitters 204 to recall state information in preparation for a read of the buffer. The four RAM read cycles are indicated by the RAM READ BUS. Together, the RAM WRITE and RAM READ BUSES form the output of the 2N:1 MUX 214 with write and read access interweaved. Using a deterministic approach to RAM access removes the need for an arbitration circuit. Data read from the buffer 200 is then processed by the transmitter and is then serially sent down the link as shown by XMT0.

Packet Receiver

Figure 5:
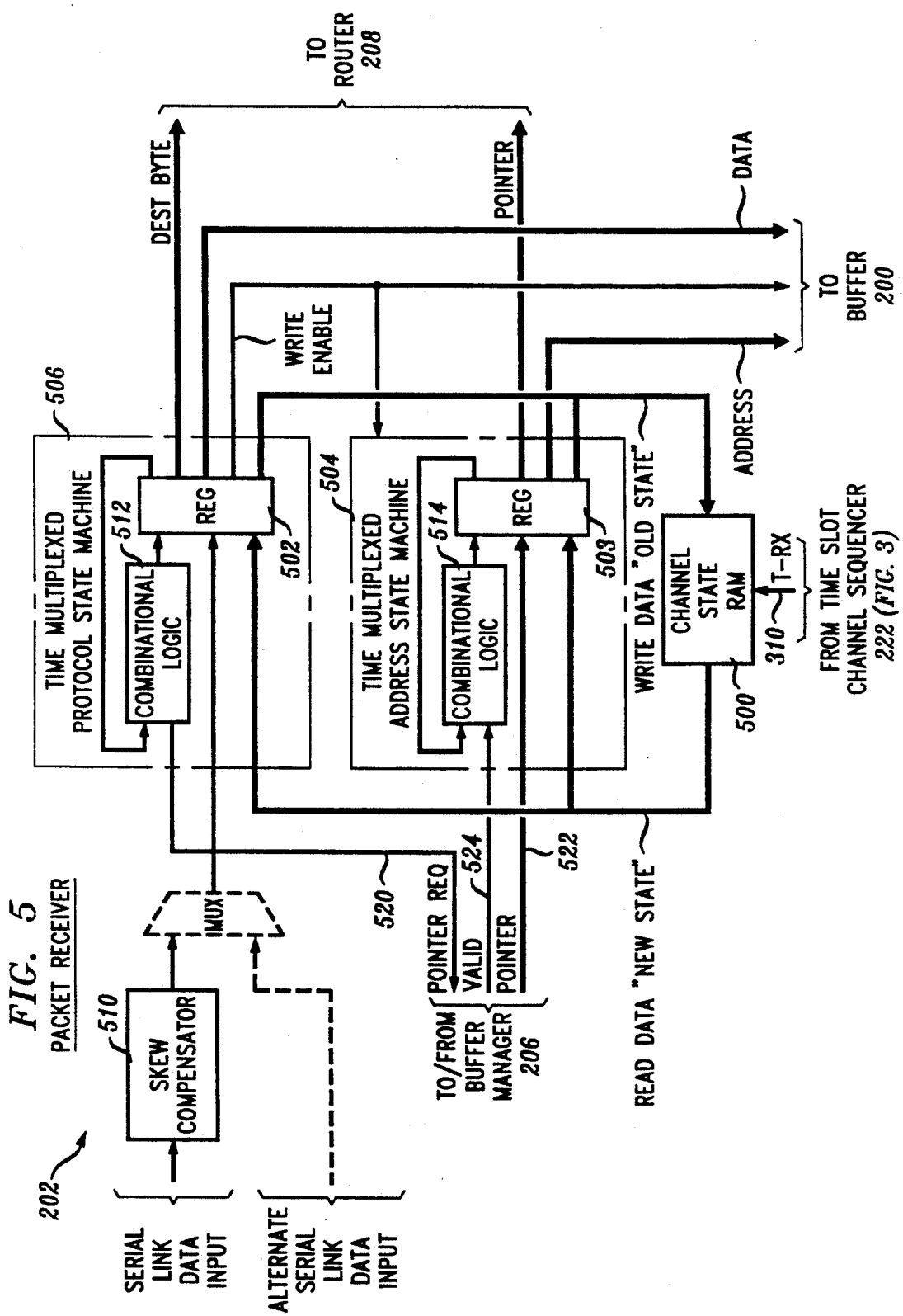
FIG. 5 is a block diagram of the packet receiver of FIG. 2 according to the exemplary embodiment of this invention.
Figure 6:
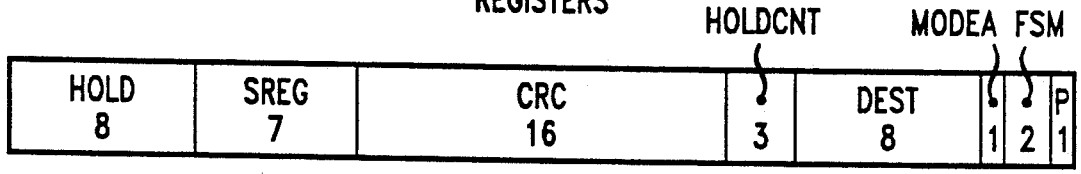
FIG. 6 is a diagram of the layout of the protocol state registers of the packet receiver of FIG. 5.
Figure 7:
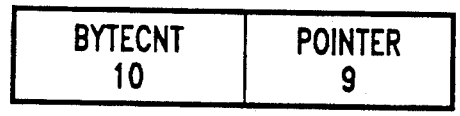
FIG. 7 is a diagram of the layout of the address state registers of the packet receiver of FIG. 5.

Turning now to FIG. 5, a block diagram is shown of packet receiver 202, according to an exemplary embodiment of this invention. Packet receiver 202 generally comprises channel state RAM 500, an address state machine 504 and a protocol state machine 506. Each state machine has a register 502, and 503 for holding state variables, and combinational logic 512, and 514 for manipulating incoming data and the state variables. Packet receiver 202 performs high level data link control (HDLC) and DMA transfers (to buffer 200) for each of up to 31 usable packet channels that may be equipped on one port. Packet receiver 202 is a time-multiplexed state machine containing state variables, as shown in FIGS. 6 and 7, for each packet channel, which are stored in channel state RAM 500 during other time slots.

Prior to each time slot, a channel number is delivered to packet receiver 202 via the T-RX bus 310 from the time slot channel sequencer 222. This channel number is used as an address index into channel state RAM 500, which is then loaded into state variable registers 502 and 503. During the time slot, protocol state machine 506 and time multiplexed address state machine 504 are clocked along with the bits received during the time slot by the system clock, as is known in the art. As a result of state machine activity, data may be written to buffer 200, pointers may be acquired from buffer manager 206 or released to router 208, or nothing may happen. At the end of the time slot, the new state variable is stored in the channel state RAM 500 to be used for the next time slot belonging to that packet channel.

In this packet switch example, the time slot data from circuit switching fabric 30 is clocked into the input port slightly out of phase with the output clock. The entire packet switch is clocked by the output (transmit) clock. Skew compensator 510 receives input data, aligns it and the clock with the rest of the packet switch by shifting data into a parallel bus at a transfer rate slow enough that the phase difference between clocks is negligible. A shift register at the output of the skew compensator increases the transfer bit rate back to normal, so that the date can be clocked into protocol state machine 506 by the system clock. Due to the time multiplexed nature of the T-RX bus data (310), it is necessary to stagger in time the bit relationships of each packet receiver. The appropriate amount of delay is inserted by the skew compensator prior to the data being clocked into the protocol state machine.

Optionally, an alternate serial data link input can be provided, along with a multiplexer to select data source, as shown in phantom in FIG. 5. Such an input could be used to merge one or more packet channels from an adjunct processor or gateway into the packet switch, allowing the processor to communicate with the switching modules by data packets.

Protocol State Machine

Combinational logic in the protocol state machine performs the functions of: packet delimiting (zero bit detection and unstuffing), packet error checking (cyclical redundancy check), packet disassembly (extract of routing byte), and length checking. Each function is performed by a combinational state machine, as is known in the art, on data stored or moved into register 502.

FIG. 6 shows the bit layouts of the state variables for the protocol state machine stored in register 502. SREG[7] is used by its associated state machine to detect start and stop of packets, ABORTs and valid data. In this exemplary packet switch, the high level data link control (HDLC) protocol was chosen to provide basic link level functions. The HDLC flag pattern of 01111110 is used to identify the start and stop of a packet. To make this pattern unique, when a packet is transmitted a zero is inserted (stuffed) after every five consecutive ones. Therefore random data will never result in a flag being transmitted prematurely. The SREG state machine identifies any instance of five ones followed by a zero, and inhibits the zero from being clocked into the HOLD register, effectively unstuffing the zero.

For each clock cycle that an unstuffed bit is clocked in, the data is shifted into the HOLD[8] register, and the bit counter HOLDCNT[3] is incremented. After 8 bits of data are clocked in, the resulting byte of data is written to a location in buffer 200 calculated by address state machine 504 via a data line, by the combinational logic in protocol state machine asserting write enable line. If the byte is the first in the packet, it is by definition the destination byte and is stored in DEST[8] (destination register). For each clock cycle where data is shifted into HOLD[8], a cyclical redundancy check is performed and stored in CRC[16], the HDLC CRC holding register. When the closing flag is received, the CRC[16] register is checked for validity, as is defined by HDLC protocol. If none of these checks fail, the DEST[8] byte is sent to router 208 on destination byte line along with the pointer on pointer-bus.

Address State Machine

Combinational logic in address state machine performs the functions of: storing the pointer in buffer 200, incrementing the packet byte counter, and calculating the next location in the buffer to write to using the pointer and the byte counter. Each function is performed by a combinational state machine, as is known in the art, on data stored in register 503.

Figure 8:
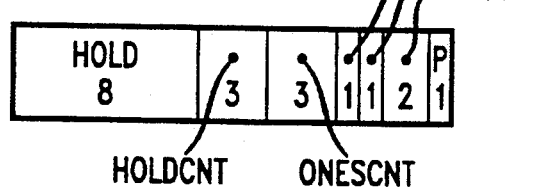
FIG. 8 is a diagram of the layout of the protocol state registers of the packet transmitter of FIG. 10.

FIG. 8 shows the layout of the state variables stored in register 503 for the combinational logic in address state machine 504. The beginning of a new packet is detected by the SREG state machine when a byte of data is received that does not contain the flag pattern (01111110). At this time, the pointer request signal is asserted over line 520 to the buffer manager, which responds by placing a pointer on the pointer distribute bus 522 and asserting the valid signal on line 524. In response to the valid signal, the pointer is moved into the POINTER[9] register and BYTECNT[10] is reset to 0. The pointer is multiplied by 576 (the buffer length) and then added to the byte counter BYTECNT[10] to form a RAM address to be sent on address line to buffer 200. The WRITE enable also causes the Address State Machine to increment the BYTECNT[10].

When the closing flag of the packet is detected by the SREG state machine, the CRC[16] register is checked for valid CRC, and the byte counter is checked for an oversized or undersized packet. If all none of these checks fail, DEST[8] is sent out on the DEST BYTE Bus, and the Ship signal (not shown) is asserted to the Address State machine. This causes the pointer to be sent out on the pointer bus, and to set the Valid bit, to clock the POINTER and DEST BYTE into the router. At this time the Packet receiver has completed the reception of one packet and is ready to start on the next.

Packet Transmitter

Figure 10:
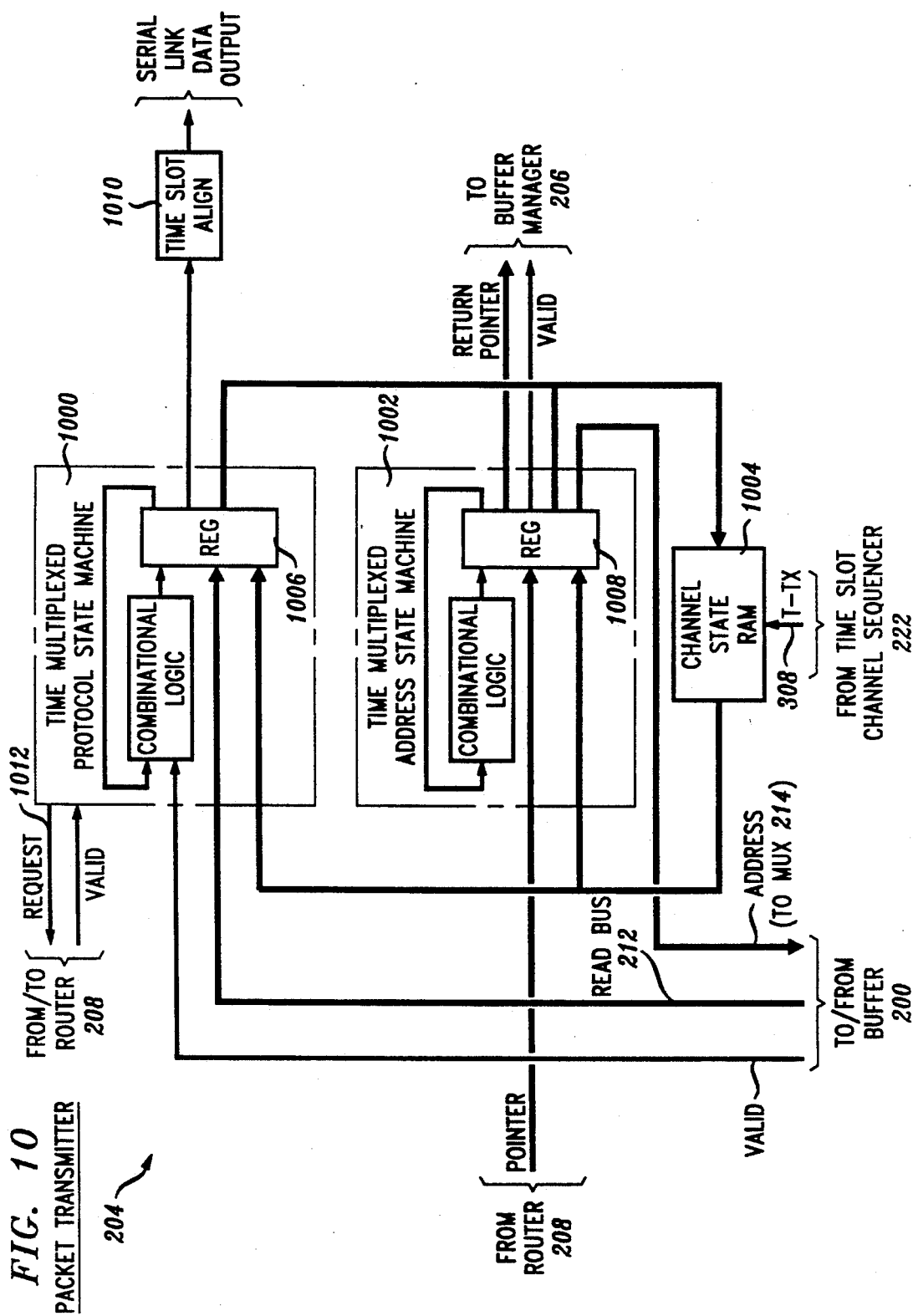
FIG. 10 is a block diagram of the packet transmitter of FIG. 2 according to the exemplary embodiment of this invention.

Turning now to FIG. 10, a packet transmitter 204 according to an exemplary embodiment of this invention. Packet transmitter 204 comprises protocol state machine 1000, address state machine 1002 and channel state RAM 1004. Each of the state machines comprises combinational logic and a register for storing variables used by the combinational logic. There is one set of state variables for each time slot, as will be described further below, and each set is stored in channel state RAM 1004 during other time slots.

The packet transmitter 204 (like the packet receiver 202) performs HDLC functions and DMA functions for each of up to 32 packet channels that may be equipped on an output port. Prior to each time slot, a channel number is delivered to channel state RAM 1004 via T-TX bus 308 from time slot channel sequencer 222. This channel number is used as an address index into channel state RAM 1004, to read the state variable registers and load them into the protocol state variable register 1006, and address state variable register 1008. During the time slot, the state machines 1000, and 1002 are clocked along with the bits of the time slot by the system clock. As a result of state machine activity, HDLC flags or data read from buffer 200 may be transmitted, and pointers may be acquired from router 208 or released to buffer manager 206. At the end of the time slot, the new state variable is stored back in channel state RAM 1004 to be used for the next time slot belonging to that packet channel.

Time Slot Alignment

Due to the time multiplexed nature of the T-TX bus data (308), it is necessary to stagger in time the bit relationships of each packet transmitter. In this packet switch example, each output port of data sent into circuit switching fabric 30 (FIG. 1) is required to be in phase with each other. Time slot align logic 1010 is used to stage each transmitter through the appropriate amount of delay, as is known in the art, to re-establish time slot synchronization with circuit switching fabric (30) across the outgoing ports.

Protocol State Machine and Address State Machine

Combinational logic in protocol state machine performs the functions of: zero bit stuffing of packet data, flag generation when not actively transmitting packet data, and length checking.

Combinational logic in address state machine 1002 performs the functions of: storing the buffer location pointer and byte counter, and calculating buffer location addresses using the pointer and byte counter.

Figure 9:
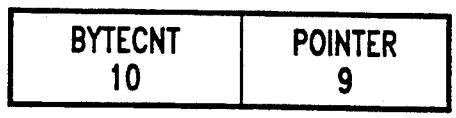
FIG. 9 is a diagram of the layout of the address state register of the packet transmitter of FIG. 10.

FIGS. 8 and 9 show the register layouts of the state variables for the address 1002 and protocol 1000 state machines. At the beginning of a time slot, state information associated with the current channel (as defined by information from T-TX bus 308) is loaded into the state variable registers 1006, and 1008. If not in packet mode (i.e., packet transmission in progress), as defined by MODEA[1], a new pointer request is sent to router 208 via line 1012. If a pointer is received from route 208 via pointer bus, it is latched into the address state machine register 1008 POINTER[9], and the byte counter variable BYTECNT[10] is cleared. The pointer is multiplied by 576 and then added to the byte counter to form the RAM address to read from buffer 200. Packet data read from buffer 200 is then latched in register 1006 and shifted out as transmit data.

A major function of the Protocol State Machine in the Transmitter is to provide zero bit insertion on the packet data read from the Packet Buffer. The HDLC protocol allows no more than five consecutive bits in the packet serial data stream to be a logical one value in order for the flag pattern (01111110) to be unique. Packet data stored in the Packet Buffer has not been zero stuffed, but rather is raw data. If the data read from the RAM should contain six consecutive logical one bits, the state machine will insert a logical zero (zero stuffing) in the sixth bit position before actually sending the sixth bit. The ONESCNT[3] counter is used to perform zero bit stuffing as the data is sent. If at the end of the time slot, all of the data bits have not been transmitted (due to zero bit stuffing) the remaining data bits are loaded into HOLD[8] with HOLDCNT[4] used to indicate the number of data bits being held in the holding register. At the end of the time slot the byte counter is incremented, unless there is an entire byte in HOLD [8], and the current state variables are returned to the channel state RAM 1004 for reuse on subsequent time slots pertaining to a given packet channel.

When the end of the packet is detected, or internal errors are detected, the next mode variable NMODEA[1] is used to indicate that the protocol state machine 1000 will be leaving packet mode and the pointer used for the current channel is returned to the buffer manager 206 for reuse. The BCAST[2] bits are provided to allow priority packets to be broadcast to all active channels.

In this example of a packet switch, it is recognized that the ability to originate packets under microprocessor control to all active destinations is useful. To implement this feature, the protocol state machine 1000 is capable of marking each active channel (as defined by T-TX Bus 308) to initiate a broadcast packet stored in a special broadcast RAM or an unused portion of Packet Buffer 200. Protocol state machine 1000 will not preempt packets being processed. After normal termination of a packet, if a channel is marked for broadcast, instead of requesting new pointers from the router, the protocol state machine 1000 will begin to access the broadcast RAM and send its contents to the destination represented by that channel. Upon completion of the broadcast transmission, the transmitter 204 resumes normal operation and requests new pointers from the Router. Note that since no pointers were used to initiate the broadcast, no pointers are required to be released by transmitter 204 to the buffer manager 206.

The above-described feature is utilized in this example to provide a "soft-switch" mechanism between packet endpoints. As in most telecommunication applications, the inter-module connection unit is fully duplicated, thus providing two complete paths to complete connections. This fast packet switch is typically operated in an active/stand-by configuration. In order to minimize packet data loss when transitioning the active/stand-by status of each side, a broadcast message is sent from the active packet switch indicating that a "side switch" is about to occur and to temporarily halt packet transmission. This ensures that data being sent into the packet switch will halt, and after a short wait for packets in transit to be sent to their destinations, all the data queued in the packet switch will be transmitted at which time the active/stand-by status of the two halves of the inter-module connection unit is switched. At this time, a second broadcast message in sent indicating that the switch is complete, and normal packet traffic can resume. Utilizing the broadcast capability in this manner prevents packets from being lost when the active side is down graded to stand-by status which would require re-transmission.

Router

Figure 11:
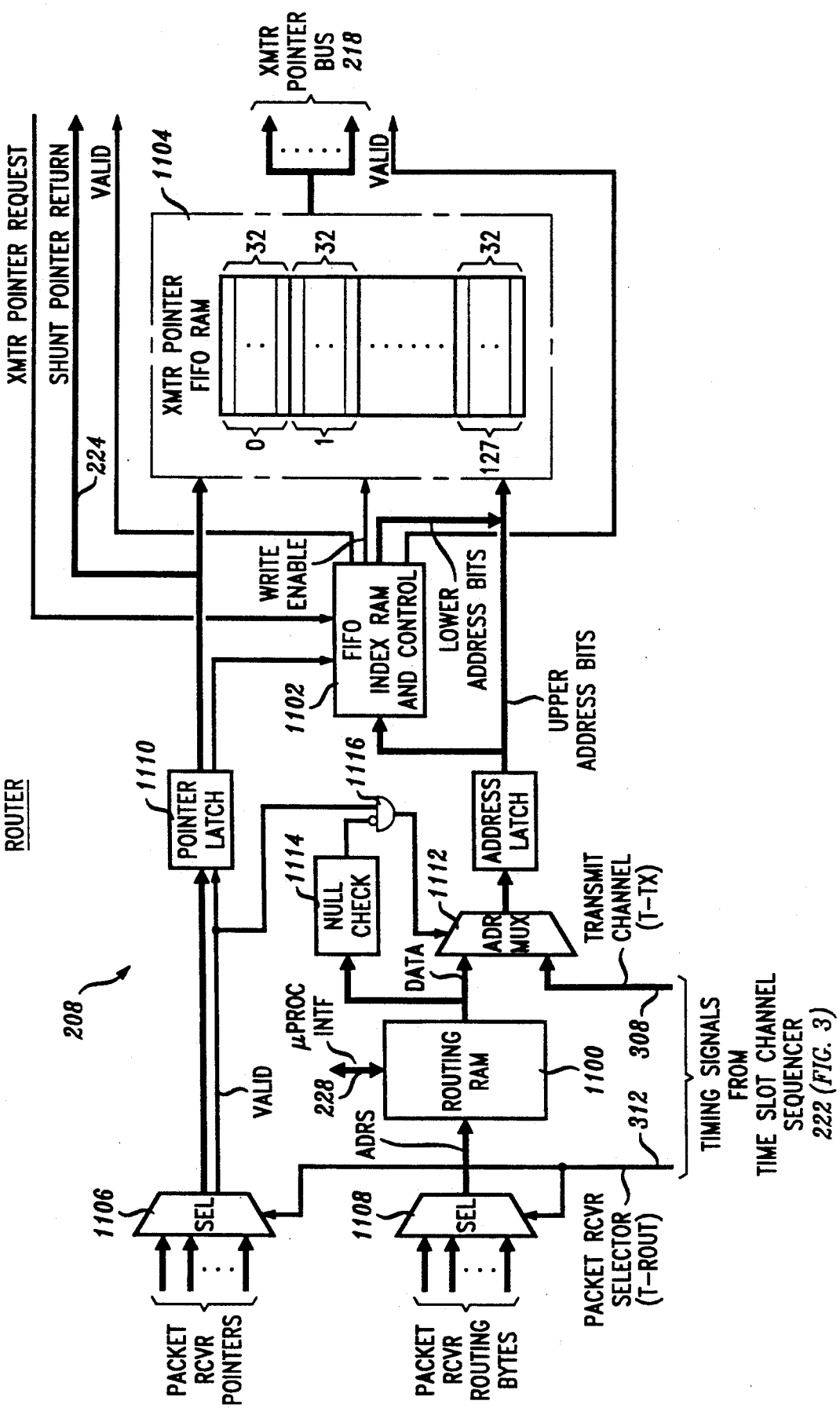
FIG. 11 is a block diagram of the router of FIG. 2 according to the exemplary embodiment of this invention.

Turning now to FIG. 11, a block diagram of router 208, FIG. 1, is shown. Router 208 primarily comprises a routing RAM 1100, a FIFO index RAM and control 1102, and a transmit pointer FIFO RAM 1104. Routing RAM 1100 uses the routing byte received from receiver 202 as an index into a table that maps destinations to channels. This data is passed to FIFO index RAM and control 1102, which uses this data as an index into transmitter pointer FIFO RAM 1104. FIFO control 1102 then causes the pointer delivered by receiver 202 to be queued for a transmitter 204 in transmitter pointer FIFO RAM 1104.

After a packet has been received and written to the buffer RAM 200 by receiver 202, router 208 takes the buffer pointer received from receiver 202 and delivers it to a packet transmitter 204 for transmission on the channel responsive to the destination byte received in the packet. The destination bytes and pointers received from receivers 202 are multiplexed into router 208 by selectors 1106 and 1108 controlled by T-ROUT 312. The buses from each packet receiver 202 are selected once per time slot. As shown in the timing diagram of FIG. 13, the pointers become valid in a staggered manner, with RCVR0 pointer valid first. T-ROUT 312 signal causes the buses to be selected in the above-stated order.

The selected destination byte contains the logical destination for the packet (i.e. Switch Module number) and is used to address the routing RAM 1100, which provides the physical channel number. The pointer is stored in pointer latch 1110 along with the pointer valid bit during the Routing RAM table lookup. One of three things can happen next, depending on the pointer valid bit and the results of the table lookup. If the pointer valid bit is asserted (because a packet was just received) and the table lookup produced a valid channel number, then the assertion of valid line causes address multiplexer 1112 to select the routing RAM 1100 data, and the assertion of WRITE ENABLE causes the pointer to be pushed onto the XMTR pointer FIFO 1104 responsive to the channel number upper address bits. Otherwise, if the pointer valid bit is asserted but the table lookup produced a null value (because there is no equipped channel responsive to the destination byte), then the address multiplexer 1112 will select the transmit channel (T-TX) bus for a possible FIFO POP operation. The VALID is blocked by the NULL check 1114, and AND gate 1116, as shown in FIG. 11. The pointer is returned to the buffer manager via the shunt pointer return, causing the buffer to be freed. Alternatively, if the pointer valid bit is not asserted (because no packet has been received); then address multiplexer 1112 will select the transmit channel (T-TX) bus for a possible FIFO POP operation.

XMTR pointer FIFO PUSH operation

Together, the XMTR pointer FIFO RAM 1104 and the FIFO index RAM and control 1102 provide a plurality of XMTR pointer FIFOs, one for each packet channel. The FIFO RAM 1104 organization in FIG. 11 shows that each FIFO can buffer up to 32 pointers. FIFO index RAM 1102 is a small fast RAM containing one control word for each XMTR FIFO. This word contains a 5-bit PUSH pointer and a 5-bit POP pointer.

Address multiplexer 1112 output provides the upper address bits for the XMTR pointer FIFO RAM 1104, identifying the correct FIFO. It's also used to index the FIFO index RAM 1102 to obtain the particular FIFO's PUSH pointer. The PUSH pointer provides the lower address bits. At this time the pointer stored in the latch is written to the appropriate XMTR pointer FIFO queue. The PUSH pointer is incremented and written back into the INDEX RAM.

The write enable is generated in FIFO index RAM and control 1102, so that a FIFO overrun test can be performed on the read and write pointers before each PUSH. If the pending PUSH would overwrite an older valid pointer, the PUSH is not allowed and the pointer is sent back to the buffer manager 206 via shunt pointer return bus.

XMTR pointer FIFO POP Operation

The FIFO POP operation removes a pointer from a FIFO and delivers it to a packet channel for transmission. POP operations may take place any time a PUSH operation is not in progress. As described above, when there is no PUSH the address multiplexer 1112 selects the T-TX signal. As shown in FIG. 4, the T-TX signal contains the channel number for the next time slot. This number is used as the upper address bits to select the FIFO for the selected channel, and serves as the index word for that channel. The INDEX POP pointer provides lower address bits for the FIFO RAM 1104. The data read from FIFO RAM 1104 is the pointer for the next packet to be transmitted on that channel.

When transmitter 204 is ready for a new packet to transmit, transmitter 200 asserts the XMTR pointer request signal to router 208. If a POP is pending, as described above, and there is at least one pointer in the selected FIFO, FIFO control circuit asserts the VALID signal to transmitter 204, causing the pointer be read by transmitter 204. The POP pointer is incremented and written back into the INDEX RAM 1102.

During a pending POP operation, there may be no pointer request, in which case the POP pointer is not incremented and no VALID signal is asserted. During a pending POP operation, the POP and PUSH pointers in the FIFO index RAM 1102 may be found to be equal, indicating there are no pointers in the FIFO, in which case the POP pointer is not incremented and no VALID signal is asserted.

The router is pipelined. After the routing RAM access, the address multiplexer 1112 output and the RX pointer are latched. While the pointer FIFO PUSH/POP operation is taking place, the Routing RAM lookup is being performed for the next channel.

Buffer Manager

Figure 12:
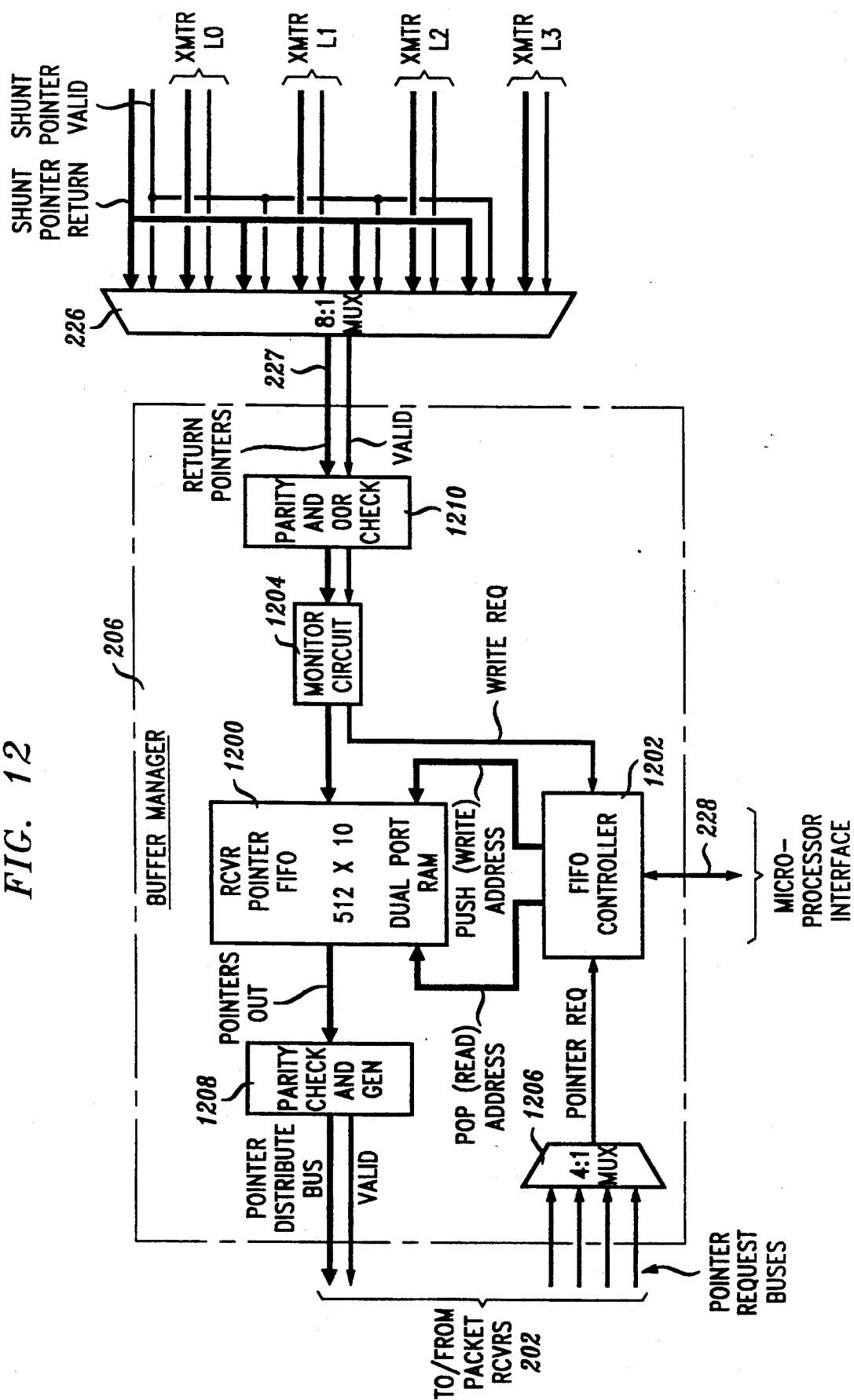
FIG. 12 is a block diagram of the buffer manager of FIG. 2 according to the preferred embodiment of this invention.

Turning now to FIG. 12, a buffer manager 206 according to the exemplary embodiment of this invention is shown. Buffer manager 206 comprises a RCVR pointer FIFO 1200, a FIFO controller 1202, and a monitor circuit 1204. RCVR pointer FIFO 1200 stores pointers until used by the system. FIFO controller 1202 responds to pointer requests and requests for returning pointers to pointer FIFO 1200. Pointer monitor 1204 enforces pointer validity.

Buffer manager 206 stores pointer resources until needed by the receivers 202. The pointers are used by packet switch 10 to represent locations in the packet buffer 200. The pointers are stored in a RAM configured at the time of system initialization as a FIFO, via processor interface 228. Processor interface 228 provides the flexibility to program the number of pointers to be pushed onto the FIFO.

Requests for pointers from receivers 202 are delivered on pointer request buses. These requests are multiplexed at 4:1 MUX 1206 and sent on pointer request bus to FIFO controller 1202. FIFO controller 1202 receives the pointer request and causes a POP operation to be sent over POP address bus to pointer FIFO 1200.

Pointer FIFO 1200 performs the POP operation on the next available pointer and sends the pointer on the pointer bus. Parity checks are performed in box 1208, as known in the art, and the pointer is sent on the pointer distribute bus along with a pointer VALID signal.

When pointers are delivered from transmitter 204, or router 208, they are received at 226 multiplexer. The output of 226 multiplexer, as shown in timing diagram 14, is sent on bus along with a VALID signal on VALID bus. Parity and out of range pointer values are checked in box 1210. This value is programmable via the processor interface and will vary, depending on number of pointers initialized in this system.

After these checks are complete, the pointer is then moved into a monitor circuit 1204. Monitor circuit 1204 enforces the validity of the circulating pointers by generating one or more target pointers within the range of the buffer, and comparing the target pointers to the pointers that are circulating through the monitor circuit. If a pointer is not encountered within a prespecified time, then it is presumed that the pointer has been lost, and is replaced by the generated pointer. If the pointer is found within the prespecified time, then another timer is set to determine whether the pointer is encountered again. If the pointer is encountered again, then all of the multiple pointers are suppressed. Advantageously, the number of pointers checked at one prespecified time period is a function of system congestion. The monitor circuit of this exemplary embodiment is the subject of the co-pending patent application Ser. No. 07/919,462, filed concurrently herewith. After these checks are complete, the pointer is then pushed onto the FIFO 1200 so that the buffer location it represents can be reused.

Figure 13:
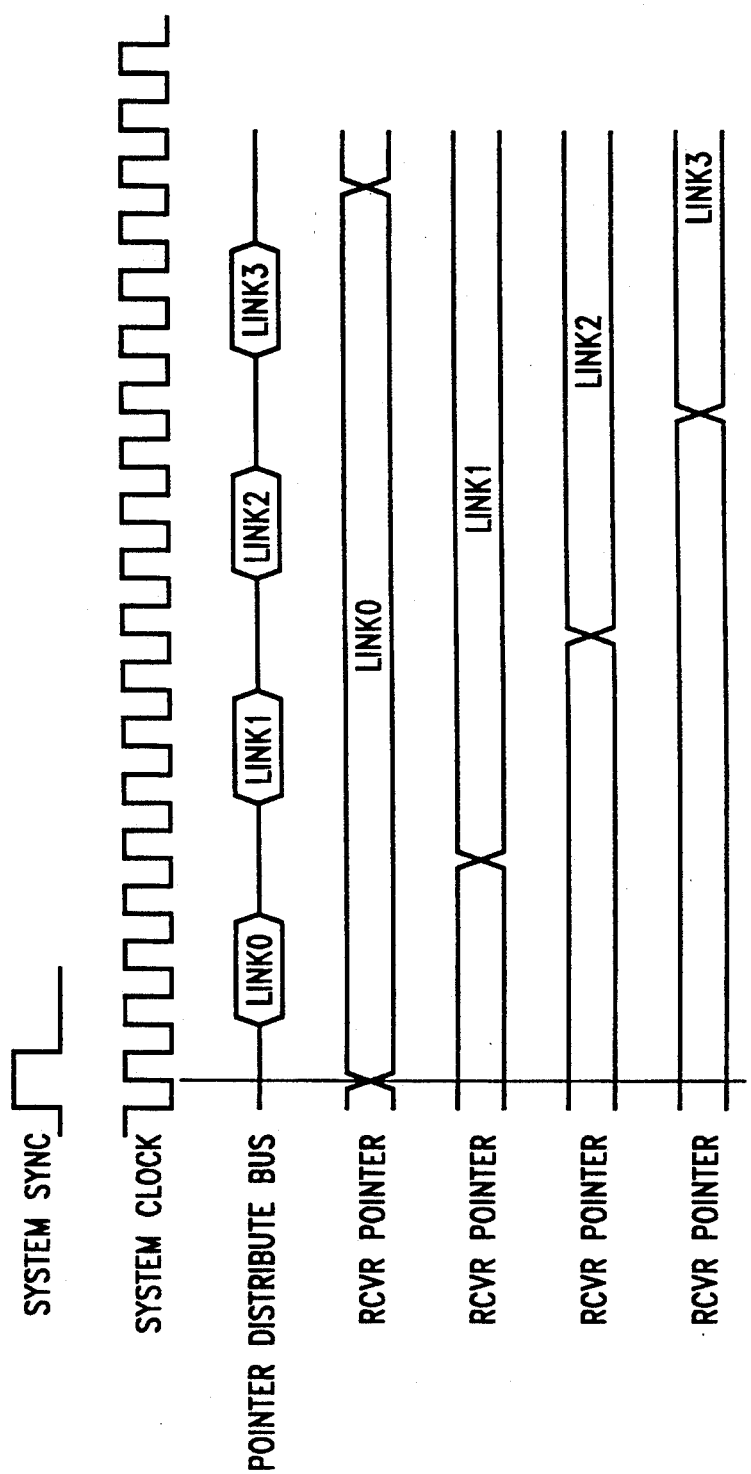
FIG. 13 is a timing diagram at output of the buffer manager of FIG. 12.

Turning now to FIG. 13, a timing diagram of the output of buffer manager 206 is shown. Pointers from buffer manager 206 are used to represent available resources to store packet data. They are distributed on an "as needed" basis on the pointer distribute bus to the receivers (FIG. 4) in a multiplexed fashion such that each Receiver can latch one pointer per time slot.

Figure 14:
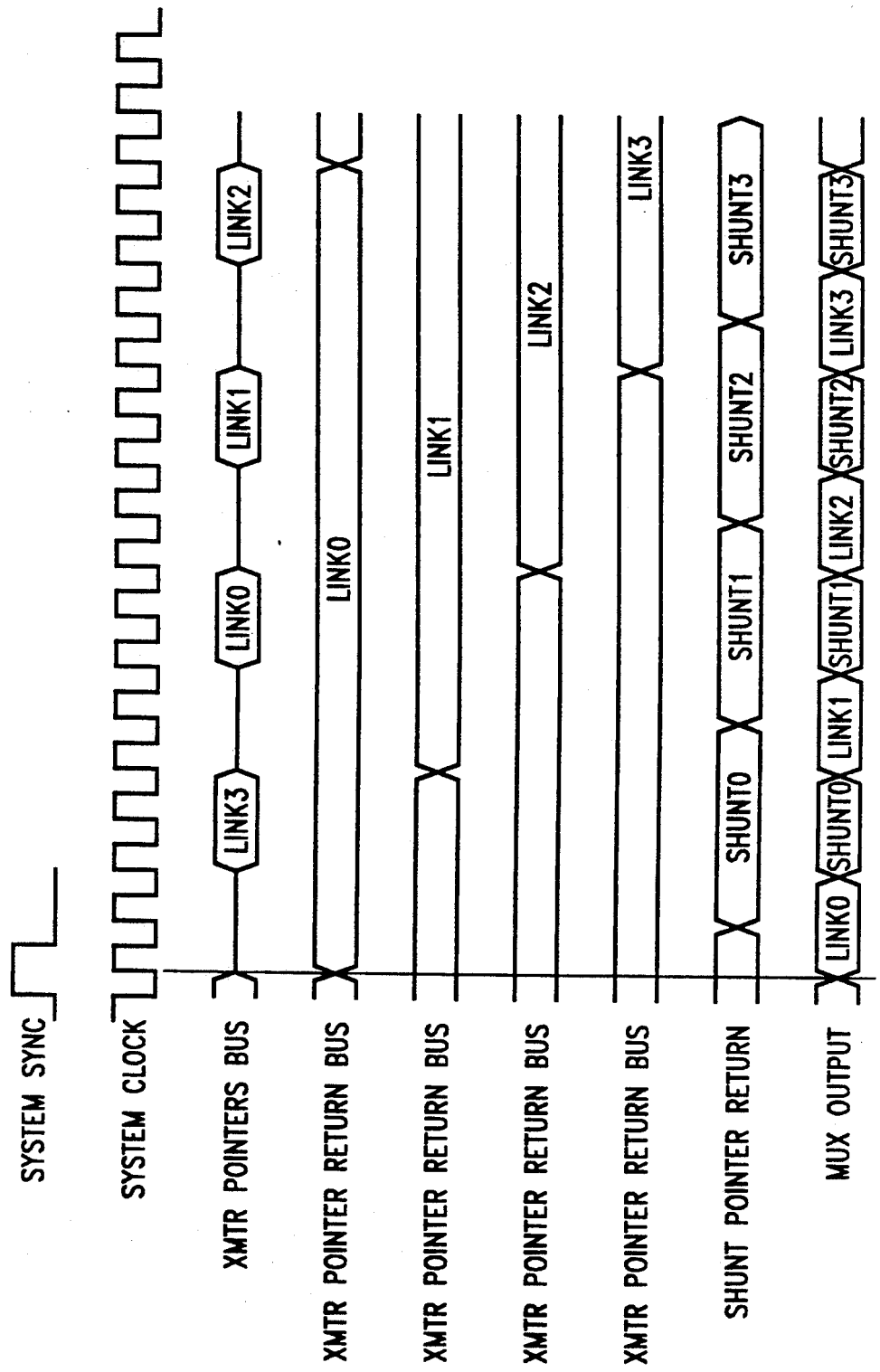
FIG. 14 is a timing diagram at the input of the buffer manager of FIG. 12.

Turning now to FIG. 14, a timing diagram of the inputs to buffer manager 206 is shown. Pointers from router 208 are used by transmitters 204 to represent packet data queued in buffer 200 that is ready for transmission. When ready, each transmitter 204 will request a new pointer from router 208. As shown in FIG. 5 the pointers are distributed via the XMTR POINTER bus to transmitters 204 in a multiplexed fashion such that each transmitter 204 latches one pointer per time slot. After the packet data has been transmitted, the pointers are returned to buffer manager 206 via the TX pointer return buses. Another source for pointers to be returned to buffer manager 206 is from the shunt pointer return bus from router 208. This path is used if errors are detected during from the receivers 202 or router 208. In this case, the erroneous packet is dropped and the pointer is shunted back to buffer manager 206. All pointers returned to buffer manager 206 are delivered via a single input that is multiplexed at multiplexer 226 to represent all possible sources for each time slot.

It is to be understood that the above-described embodiments are merely illustrative principles of the invention and that many variations may be devised by those skilled in the art without departing from the scope of the invention. It is, therefore, intended that such variations be included within the scope of the appended claims.

We claim:

1. A fast packet switch for routing data packets from a source to a destination, said data packets having a destination address, said switch comprising:

a plurality of input ports, a plurality of output ports, a buffer connected to said input ports and said output ports, a buffer manager connected to said input ports and said output ports, and a router connected to said input ports and said output ports;

said buffer manager selecting a location in said buffer in response to notification of receipt of a data packet at one of said input ports and producing data representing said buffer location, said input ports each having means responsive to receipt of said data representing said buffer location for delivering said incoming packet to said buffer location;

said router having means responsive to receipt of said data representing said buffer location and said destination address from said input ports for delivering said data representing said buffer location to a selected one of said plurality of output ports responsive to said destination address;

each of said output ports having means responsive to receipt of said data representing said buffer location for retrieving said data packet from said buffer location, transmitting said data packet and returning said data representing said buffer location to said buffer manager.

2. A fast packet switch according to claim 1 wherein said input ports receive data packets from a plurality of channels.

3. A fast packet switch according to claim 2 wherein each of said channels comprises one or more time slots, said input ports having means responsive to the arrival of each of said time slots to direct data received during that time slot to said buffer location selected by said buffer manager for said time slot.

4. A fast packet switch according to claim 3 wherein each of said input ports comprises a protocol state machine and an address state machine, said protocol state machine sequentially receiving data during each time slot and delivering said data to a location in said buffer based on an address calculated at said address state machine, wherein data for each data packet is stored sequentially in the order received in said buffer.

5. A fast packet switch according to claim 4 wherein each of said input ports further comprises a channel state buffer for storing information for said protocol state machine and said address state machine for each channel.

6. A fast packet switch according to claim 1 wherein said router comprises means for mapping said destination address to one of said output ports.

7. A fast packet switch according to claim 1 wherein said router comprises an output port FIFO for queuing said data representing said buffer location for said selected output port.

8. A fast packet switch according to claim 1 wherein said router comprises a look-up table for mapping said destination address to one of said output ports and an output port FIFO for queuing said data representing said buffer location for said selected output port.

9. A fast packet switch according to claim 1 wherein said output ports transmit data packets over a selected one of a plurality of channels.

10. A fast packet switch according to claim 9 wherein each of said channels comprises one or more time slots, said output port being responsive to the arrival of each of said time slots to transmit said data packet from said buffer during each time slot over said selected channel.

11. A fast packet switch according to claim 10 wherein each of said output ports comprises a protocol state machine and an address state machine, said protocol state machine obtaining data from said buffer location based on an address calculated by said address state machine and sequentially transmitting said data on each time slot.

12. A fast packet switch according to claim 11 wherein each of said output ports further comprises a channel state buffer for storing information for said protocol state machine and said address state machine for each channel.

13. A fast packet switch according to claim 1 wherein said buffer manager comprises a FIFO queue for storing said data representing said buffer locations.

14. A fast packet switch according to claim 13 wherein said buffer manager is responsive to said input ports for removing one of said data representing said buffer locations from said FIFO queue and delivering said data representing said buffer locations to said input ports and is further responsive to said output port delivering said data representing said buffer locations for returning said data representing said buffer locations to said FIFO queue.

15. A method for use in a packet switch for routing data packets from a source to a destination, said data packets each having a destination address and an end of packet signal, said packet switch comprising an input port, a plurality of output ports, a buffer connected to said input port and said output port, a buffer manager for allocating and deallocating pointers to locations in said buffer, and a router means for selecting one of said plurality of output ports, said method comprising:
  responsive to receipt of a data packet from said source, said input port requesting a pointer from said buffer manager;
  responsive to said pointer request, said buffer manager allocating a pointer corresponding to a specific buffer location;
  responsive to receipt of said pointer, said input port delivering said data packet to said buffer, starting at said location, as said data packet is received from said source;
  responsive to receipt of said end of packet signal, said input port delivering said pointer and said destination address to said router means;
  responsive to receipt of said pointer and said destination address, said router selecting one of said plurality of output ports, and delivering said pointer to said selected output port;
  responsive to receipt of said pointer, said selected output port retrieving said data packet from said buffer and transmitting said data packet to said destination; and
  responsive to transmitting said end of packet signal, said selected output port returning said pointer to said buffer manager.

16. A method according to claim 15 wherein said step of delivering said data packet to said buffer comprises receiving said data packets on a plurality of channels delivered during a plurality of time slots by receiving a portion of said data packet during each time slot and delivering said portion of said data packet to its location in said buffer based on said pointer allocated for that data packet.

17. A method according to claim 15 wherein said step of selecting one of said plurality of output ports comprises looking up said destination address to derive said selected output port and queuing said pointer for said output port.

18. A method according to claim 15 wherein said step of retrieving said data packets from said buffer and transmitting said data packets comprises transmitting said data packets on a plurality of channels during a plurality of time slots, said selected output port retrieving data for said data packets from said buffer using said pointer and delivering said data packets on a predetermined channel.

19. A method according to claim 15 wherein said step of allocating a pointer comprises selecting said pointer from a queue of pointers on a first in, first out basis.

20. A method according to claim 15 wherein said steps are performed in a pipelined fashion.

21. A fast packet switch for routing data packets from a source to a destination, said data packets having a destination address, said switch comprising:
  buffer means having a plurality of locations for storing data;
  pointer control means for controlling storage of said data packets in said buffer means;
  input means for receiving data packets from said source and delivering said data packets to said buffer means under control of said pointer control means;
  a plurality of output means for sending said data packet to said destinations, said output means determining the destinations of said data packets in response to said pointer control means; and
  routing means for selecting one of said plurality of said output means responsive to said pointer control means and said destination address.

22. A fast packet switch according to claim 21 wherein said input means receive data packets from a plurality of channels, wherein each of said channels comprises one or more time slots, said input means being responsive to the arrival of each of said time slots to direct data received during each time slot to its proper location in said buffer means.

23. A fast packet switch according to claim 22 wherein each of said input means comprises a protocol state machine and an address state machine for sequentially receiving data on each time slot at said protocol state machine and delivering said data to a location in said buffer means based on an address calculated at said address state machine based on data received from said pointer control means.

24. A fast packet switch according to claim 21 wherein said router means comprises means for mapping said destination address to one of said output ports.

25. A fast packet switch according to claim 21 wherein said router means comprises an output port FIFO for queuing data received from said pointer control means and said destination address for delivery to said selected output means.

26. A fast packet switch according to claim 21 wherein said router means comprises a look-up table for mapping said destination address to one of said output means and an output means FIFO for queuing data received from said pointer control means and said destination address for delivery to said selected output means.

27. A fast packet switch according to claim 21 wherein said output means transmit data packets over a selected one of a plurality of channels, said channel being selected according to said destination address, wherein each of said channels comprises one or more time slots, said output means being responsive to the arrival of each of said time slots to transmit said data packet from said buffer during each time slot over said selected channel.

28. A fast packet switch according to claim 21 wherein said buffer controller comprises a FIFO queue for storing pointer to said buffer locations; said buffer controller being responsive to said input means for removing one of said pointer from said FIFO queue and delivering said pointer to said input means and is further responsive to said output means delivering said pointer for returning said pointer to said FIFO queue.

* * * * *